United States Patent
Yoo et al.

(10) Patent No.: US 9,875,255 B2
(45) Date of Patent: Jan. 23, 2018

(54) TERMINAL AND METHOD FOR SHARING CONTENT THEREOF

(71) Applicant: Samsung Electronics Co., Ltd., Suwon-si (KR)

(72) Inventors: Sang Hyun Yoo, Seoul (KR); Kyoung Gu Woo, Seoul (KR); Seok Jin Hong, Hwaseong-si (KR); Yo Han Roh, Hwaseong-si (KR); Ji Hyun Lee, Hwaseong-si (KR); Ho Dong Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 116 days.

(21) Appl. No.: 14/566,529

(22) Filed: Dec. 10, 2014

(65) Prior Publication Data
US 2015/0178553 A1    Jun. 25, 2015

(30) Foreign Application Priority Data
Dec. 20, 2013    (KR) ........................ 10-2013-0160230

(51) Int. Cl.
*G06K 9/00* (2006.01)
*G06F 17/30* (2006.01)

(52) U.S. Cl.
CPC .. *G06F 17/30256* (2013.01); *G06F 17/30047* (2013.01); *G06K 9/00295* (2013.01); *G06K 9/00677* (2013.01)

(58) Field of Classification Search
None
See application file for complete search history.

(56) References Cited

U.S. PATENT DOCUMENTS

| | | | | |
|---|---|---|---|---|
| 8,560,625 | B1* | 10/2013 | Hardman | G06K 9/00677 382/118 |
| 2008/0021876 | A1* | 1/2008 | Ahern | G06F 9/4436 |
| 2008/0220750 | A1* | 9/2008 | Steinberg | G06K 9/00221 455/414.1 |
| 2010/0287053 | A1* | 11/2010 | Ganong | G06F 17/30247 705/14.66 |
| 2012/0117057 | A1* | 5/2012 | Adimatyam | H04N 21/4147 707/723 |

(Continued)

FOREIGN PATENT DOCUMENTS

| JP | 2012-235397 A | 11/2012 |
|---|---|---|
| JP | 2012-252613 A | 12/2012 |

(Continued)

*Primary Examiner* — Sumati Lefkowitz
*Assistant Examiner* — Ryan P Potts
(74) *Attorney, Agent, or Firm* — NSIP Law

(57) ABSTRACT

A terminal and a method for sharing content are provided. A terminal includes an image acquirer configured to acquire face image data from a camera while content is being displayed, a face recognizer configured to recognize a face included in the face image data, a face change detector configured to detect whether the recognized face is different from a face recognized in a previous image data, a contact searcher configured to, in response to the detection that the recognized face is different from the face recognized in the previous image data, search a contact corresponding to the recognized face, and an information transmitter configured to transmit content usage information to the searched contact.

21 Claims, 11 Drawing Sheets

(56) References Cited

U.S. PATENT DOCUMENTS

| | | | | |
|---|---|---|---|---|
| 2012/0321196 A1* | 12/2012 | Tanigawa | .......... | H04M 1/27455 382/195 |
| 2013/0144915 A1* | 6/2013 | Ravi | ................ | G06F 17/30035 707/785 |
| 2013/0198280 A1* | 8/2013 | Liu | ................ | H04N 21/25891 709/204 |
| 2015/0016693 A1* | 1/2015 | Gattuso | ............. | G06K 9/00288 382/118 |
| 2015/0074206 A1* | 3/2015 | Baldwin | ................ | H04L 51/10 709/206 |

FOREIGN PATENT DOCUMENTS

| | | |
|---|---|---|
| KR | 10-2009-0011153 A | 2/2009 |
| KR | 10-2013-0042397 A | 4/2013 |

\* cited by examiner

TERMINAL AND METHOD FOR SHARING CONTENT THEREOF

CROSS-REFERENCE TO RELATED APPLICATION(S)

This application claims the benefit under 35 USC 119(a) of Korean Patent Application No. 10-2013-0160230 filed on Dec. 20, 2013, in the Korean Intellectual Property Office, the entire disclosure of which is incorporated herein by reference for all purposes.

BACKGROUND

1. Field

The following description relates to a terminal and a method for sharing content.

2. Description of Related Art

With the widespread use of smart phones, smart phone users are actively sharing a variety of contents, such as music, pictures, documents, and the like, among each other.

To share content with other users, a method generally used for transmitting the content entails the use of a messaging application such as an SNS, an e-mail, a Bluetooth®, or the like. A terminal user generally personally searches for the recipients with whom the user wants to share the content.

While such a method is useful when the recipient is far away from the user, the method is inconvenient when the recipient with whom the user wants to share the content is right next to the user.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a terminal including an image acquirer configured to acquire face image data from a camera while content is being displayed, a face recognizer configured to recognize a face included in the face image data, a face change detector configured to detect whether the recognized face is different from a face recognized in a previous image data, a contact searcher configured to, in response to the detection that the recognized face is different from the face recognized in the previous image data, search a contact corresponding to the newly recognized face, and an information transmitter configured to transmit content usage information to the searched contact.

The camera may be disposed on a same side as a display of the terminal.

The contact may include at least one of an email address, a phone number, a Bluetooth® address, a mobile instant messenger address, and an SNS address.

The contact searcher may be configured to search the contact corresponding to the newly recognized face in a non-transitory storage of the terminal.

The contact searcher may be configured to search the contact corresponding to the newly recognized face in an external server.

The contact searcher may be configured to transmit information on the newly recognized face to the external server, and to receive the contact corresponding to the newly recognized face from the external server.

The contact searcher may be configured to compare the new face to a face image stored in the terminal, and to search the contact corresponding to the new face.

The content usage information may include content data or a download address of the content data.

In response to a determination that a plurality of the searched contacts exists, the contact searcher may be configured to display the plurality of the searched contacts through the display of the terminal.

The information transmitter may be configured to output a message for checking whether to transmit the content usage information to the searched contact.

In another general aspect, a method for sharing content of a terminal may involve acquiring face image data from a camera while content is being displayed, recognizing a face included in the face image data, detecting whether the recognized face is different from a face recognized in a previous image data, in response to the detection that the recognized face is different from the face recognized in the previous image data, searching a contact corresponding to the newly recognized face, and transmitting content usage information to the searched contact.

The camera may be disposed on a same side of the terminal as a display of the terminal.

The contact may include at least one of an email address, a phone number, a Bluetooth® address, a mobile instant messenger address, and an SNS address.

The searching of the contact may involve searching the contact corresponding to the newly recognized face in a non-transitory storage of the terminal.

The searching of the contact may involve searching the contact corresponding to the new face in an external server.

The searching of the contact may involve transmitting information on the newly recognized face to the external server, and receiving the contact corresponding to the newly recognized face from the external server.

The searching of the contact may involve comparing the newly recognized face to a face image stored in the terminal, and searching the contact corresponding to the newly recognized face.

The content usage information may include content data or a download address of the content data.

In response to a determination that a plurality of the searched contacts exists, the method further involve displaying the plurality of the searched contacts through the display of the terminal.

The method may further involve outputting a message for checking whether to transmit the content usage information to the searched contact.

In another general aspect, a terminal includes a display configured to display content, a camera configured to acquire an image while the content is displayed, a face recognizer configured to recognize a face included in the image, a non-transitory memory storage configured to store contacts, and an information transmitter configured to transmit content usage information to a contact corresponding to the face recognized in the image.

The terminal may further include a face change detector configured to detect whether the face recognized in the image is different from a face recognized in a previous image, and a contact searcher configured to, in response to the detection that the recognized face is different from the face recognized in the previous image, search the contact corresponding to the face recognized in the image.

The information transmitter may be configured to transmit the content usage information to another terminal via the searched contact, and the searched contact may include at least one of an email address, a phone number, a Bluetooth® address, a mobile instant messenger address, and an SNS address.

Other features and aspects will be apparent from the following detailed description, the drawings, and the claims.

Figure 1:
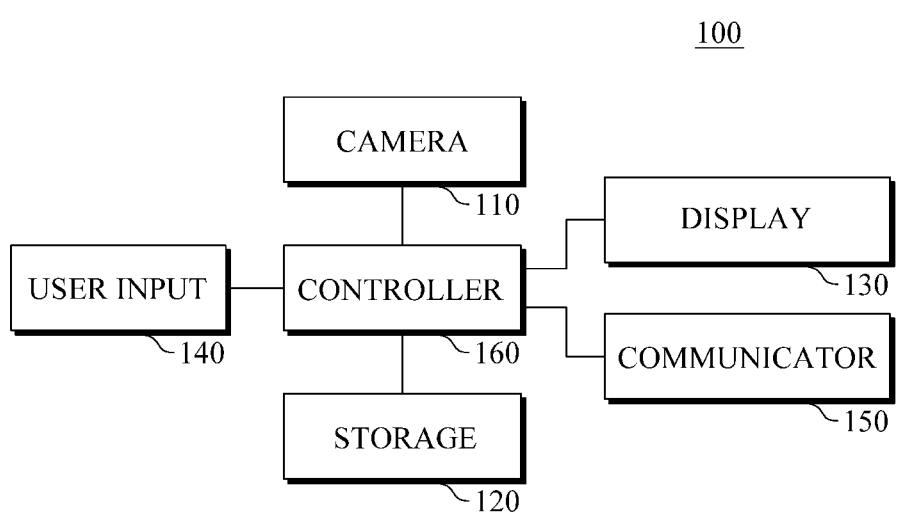
FIG. 1 is a diagram illustrating an example of a terminal according to the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Content described in various embodiments of terminals and methods for sharing content described herein includes audios, videos, images, text content, messages, files, links or hyperlinks with regard to content, such as Uniform Resource Locator (URL), hypertexts, communication content such as Short Messaging Services (SMS), multimedia messaging services (MMS), calls. and emails.

FIG. 1 is a diagram illustrating a terminal according to one embodiment.

A terminal according to one example may be implemented as an apparatus with a function of automatically determining a user's intent to share the content played in a terminal and the subject or the recipient with whom to share the content based on face recognition to thereby transmit relevant information so as to share the content with the subject. The terminal may be a mobile terminal or a fixed terminal. The mobile terminal may include a mobile phone, a smartphone, a tablet PC, a laptop computer, a digital-broadcasting terminal, a Personal Digital Assistant (PDA), a Portable Multimedia Player (PDA), a navigation, and the like. The fixed terminal may include a digital TV, a smart TV, a desktop computer, and the like.

For convenience of description, a smartphone is just one example used for the following explanation.

Referring to FIG. 1, a terminal 100 includes a camera 110, storage 120, a display 130, a user input 140, a communicator 150, and a controller 160.

The camera 110 is disposed at a position that helps capture a face of a user using content played through the display 130. In another example, the camera 110 may be disposed on the same side as the display 130 of the terminal 100.

The storage 120 may store personal information personally input by the user or input through another path, such as incoming calls and downloading files from the internet. In this example, as the personal information enables the identification of the counterpart, it may include a name, contact information, and a facial image, and the like. The contact information may include a phone number, an e-mail address, the terminal's Bluetooth® address, a mobile instant messenger (MIM) address, a social network service (SNS) address, and the like.

The storage 120 may include a non-transitory memory, such as a flash type memory, a hard disk, a multimedia card micro type memory, a card-typed memory (e.g. SD or XD memory), Random Access Memory (RAM), Static Random Access Memory (SRAM), Read Only Memory (ROM), Electrically Erasable Programmable Read Only Memory (EEPROM), Programmable Read Only Memory (PROM), magnetic memory, a magnetic disk, an optical disc, and the like. Also, the terminal 100 may operate an external storing medium, such as a web storage performing a storing function of the storage 120 on the web.

The display 130 may visually display and output the information processed in the terminal 100. Also, as described later, the display 130 is capable of visually providing a variety of information provided by the controller 160.

The display 130 may include a liquid crystal display, a thin film transistor liquid crystal display, an organic light emitting diode, a flexible display, or a three-dimensional display, and the like. Also, depending on implementation of the terminal 100, two or more displays 130 may be provided in a terminal.

In another example, the display 130 may be in a mutually layered form with the touchpad so as to be implemented as a touch screen. In such a case, the display 130 may be used as an input device as well as an output device.

The user input 140 receives input of a variety of manipulation signals from a user and generates input data for an operation control of the terminal 100. The user input 140 may, for example, include a keypad, a dome switch, a touchpad such as a resistive touchpad or a capacitive touchpad, a jog wheel, a jog switch, a H/W button, and the like. For example, if the touchpad is formed in a mutually layered structure with the display 130, the touchpad may be called a touchscreen.

The communicator 150 may transmit and receive data with other devices through wired or wireless networks, such as wireless internet, wireless intranet, wireless phone network, wireless local area network (LAN), Wi-Fi® network, Wi-Fi® direct (WFD) network, 3G network, 4G long term evolution (LTE) network, Bluetooth® network, Infrared Data Association (IrDA) network, Radio Frequency Identification (RFID) network, Ultra WideBand (UWB) network, Zigbee network, near field communication (NFC) network, etc. To this end, the communicator 150 may include a mobile communication module, a wireless internet module, a wired internet module, a Bluetooth® module, an NFC module, and the like, to which the example is not, however, limited.

The controller 160 may control overall operations of the terminal 100. The controller 160 may perform each function of the terminal 100 according to input signals input by the user input 140 and display information, such as a function performing state and a function performing result, etc., through the display 130.

The controller 160 may play relevant content according to content playing signals input by the user input 140 to display the relevant content through the display 130. Also, the controller 160 may detect a change of a user viewing the content through the face recognition, and transmit, to a new user, information that helps use of the content that is being played. Here, the information that helps use of the content may include content data and an address for downloading the content (e.g. a URL and a hyperlink), and the like.

Figure 2:
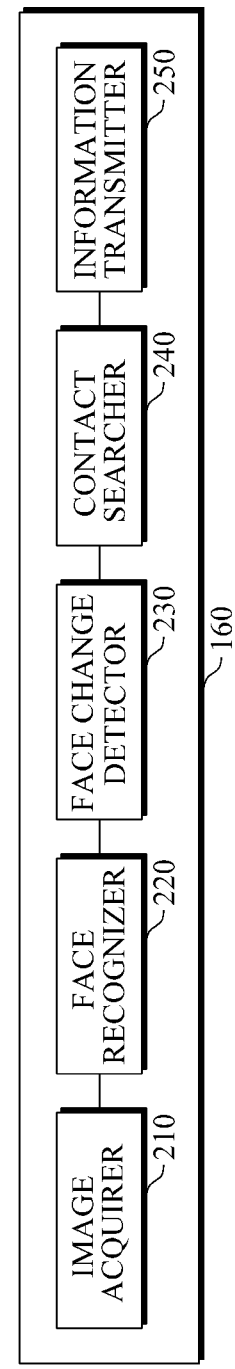
FIG. 2 is a detailed diagram illustrating an example of a controller according to the example illustrated in FIG. 1.

FIG. 2 illustrates an example of a controller in a terminal according to FIG. 1.

Referring to FIGS. 1 and 2, a controller 160 may include an image acquirer 210, a face recognizer 220, a face change detector 230, a contact searcher 240, and an information transmitter 250.

The image acquirer 210 may acquire face image data of a user viewing the content through a camera 110 while the content is being played through a display 130 of the terminal 100.

The face recognizer 220 may recognize the face included in the face image data acquired by the image acquirer 210.

To this end, the face recognizer 220 may use various face recognition algorithms. The face recognition algorithm may use various well-known methods to detect a face area corresponding to a user's face from a face image acquired through a camera, as technology of recognizing a face through a position recognition of a face's contour, eyes, chin, and mouth in entire image space. For example, a method of recognizing a face with geometric characteristics of the size and position of the face's components, such as eyes, nose, and mouth, may be used. In addition, a method of recognizing a statistical value of the entire face as a characteristic may be used. The method of recognizing a statistical value of the entire face as a characteristic may include Principal Component Analysis (PCA), Linear Discriminant Analysis (LDA), Multilinear Principal Component Analysis (MPCA), and the like.

The face change detector 230 may detect whether a face is changed on the basis of a face recognition result from the face recognizer 220.

For example, in the event that a user viewing the content while the content is being played is changed from user A to user B, the face recognizer 220 may recognize the face of the user A before the change, and the face of the user B after the change, based on a time point of the change of the user viewing the content. In such a case, the face change detector 230 may detect the change, and determine that the user viewing the content has been changed from the user A to the user B.

According to a detection result from the face change detector 230, in a case in which the face that has been recognized in the face recognizer 220 is changed while the content is being played, the contact searcher 240 may search a contact corresponding to the new face recognized by the face recognizer 220.

In an example, the contact searcher 240 may search contact information corresponding to the changed face in comparison with the changed face recognized in the face recognizer 220 and the face image stored in the storage 120.

In another example, the contact searcher 240 may search contact information corresponding to the new face in an external server that stores personal information. The contact searcher 240 may, for example, transmit the information on the new face (e.g., face image data of the new face) to the external server through the communicator 150, and receive contact information corresponding to the new face from the external server through the communicator 150. In such a case, the external server may compare the received information and the pre-stored personal information, search the contact information corresponding to the new face, and transmit the contact corresponding to the new face to a terminal 100.

Here, the external server may include web storage, a mobile instant messenger-related server, an SNS related server, and the like.

According to a result of the search of the contact information, in the event that a plurality of contact information has been searched, the contact searcher 240 may enable the display 130 to display the plurality of the searched contacts for a user to select at least one of the plurality of searched contact information.

In such a case, if at least one of the plurality of the displayed contacts is selected by the user, the information transmitter 250 may transmit information that helps use of the content to at least one of the selected contacts, as described later.

An example in which multiple contacts were returned as the search result is described hereinafter.

The case may, for example, include an example in which a user viewing the content is changed from the user A to the user B while the content is being played, and where a plurality of contact information on user B is stored in the storage 120 of the terminal 100. Here, the contact information may include a phone number, an e-mail address, a Bluetooth® address, a mobile instant messenger address, an SNS address, and the like. In such a case, the contact searcher 240 may search a plurality of contact information on user B. That is, a plurality of contact information with respect to one person may be searched.

In another example, a user viewing the content is changed from the user A to users C and D while the content is being played, and where one contact information (e.g., one phone number) for each of the user C and the user D is stored in the storage 120 of the terminal 100. In such a case, the contact searcher 240 may search all the contact information of the users C and D. That is, all the contact information with respect to each of a plurality of people may be searched.

In another example, a user viewing the content is changed from the user A to users E and F while the content is being played, and a plurality of contact information for each of the users E and F is stored in the terminal. In this example, the contact information may include a phone number, an e-mail address, a Bluetooth® address, a mobile instant messenger address, an SNS address, and the like. In this event, the contact searcher 240 may search a plurality of contact information for each of the users E and F. That is, the plurality of contact information for each of a plurality of people may be searched.

The information transmitter 250 may transmit information (hereinafter referred to as content usage information) that helps use of content being played in the terminal 100 to the contact searched by the contact searcher 240. In an example, the information transmitter 250 may transmit the content usage information through Bluetooth®, an MMS message, an e-mail, a mobile instant messenger, an SNS, and the like, according to a type of the searched contact information. Here, the content usage information may include content data itself, an address where the content is capable of being downloaded (e.g., a URL and a hyperlink, etc.), and the like.

In addition, the information transmitter 250 may output a message to finally confirm whether or not to transmit the content usage information before transmitting the contact usage information to the contact searched by the contact searcher 240. Hereinafter, the message is referred to as a transmission request/deny message. As a method for outputting the message, the message may be output visually through the display 130 or acoustically through a speaker (not illustrated) of the terminal 100. In an example in which a transfer command is input from a user provided with the transmission request/deny message, the information transmitter 250 may transmit the content usage information to the contact searched by the contact searcher 240.

Figure 3A:
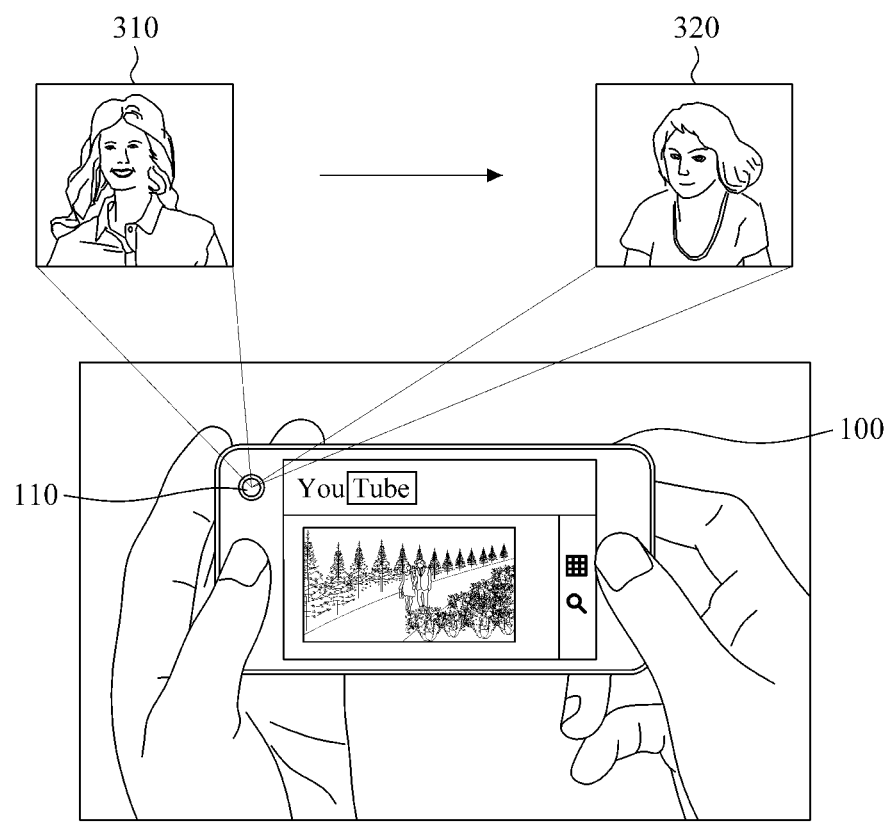
FIGS. 3A to 3C are diagrams illustrating an example of a method of using a terminal to share content by searching for one contact.
Figure 3B:
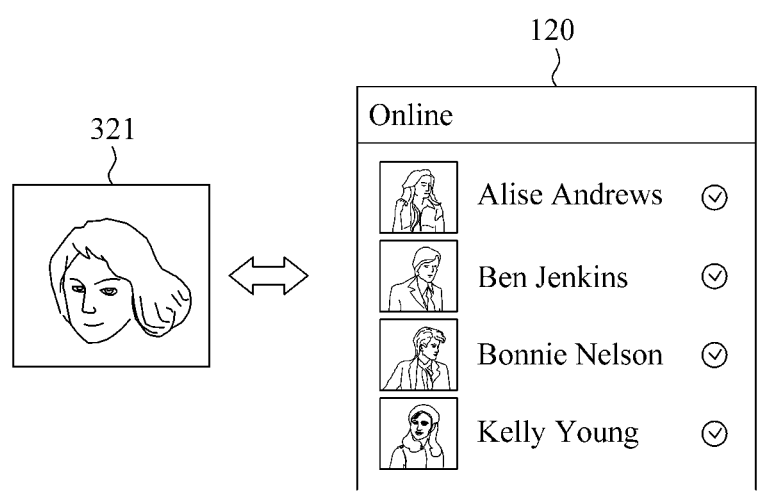
Figure 3C:
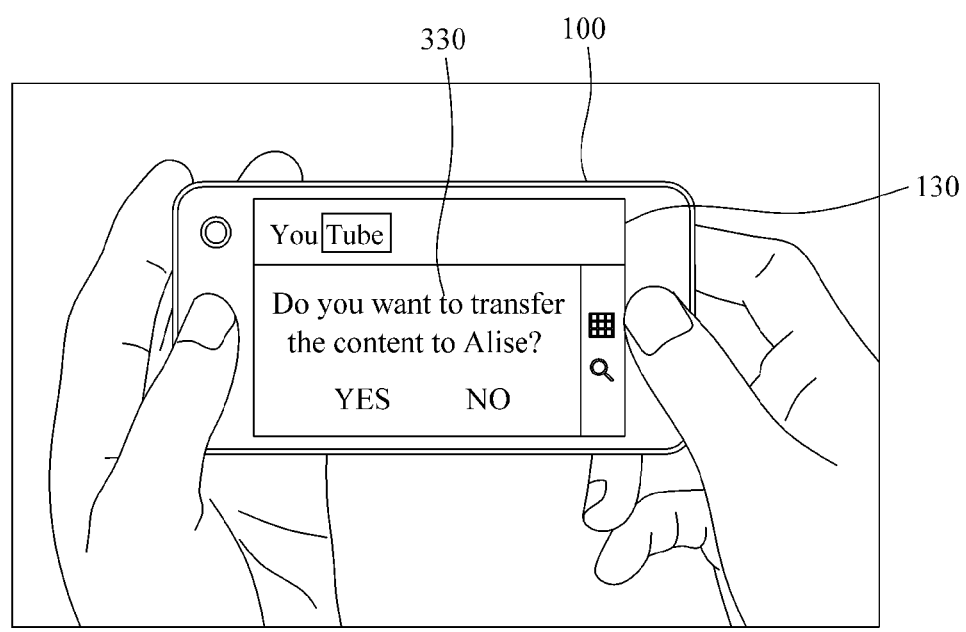

FIGS. 3A through 3C are diagrams illustrating an example of a method of using a terminal to share content after searching one contact. For instance, FIG. 3A illustrates an example of a terminal acquiring an image including a user's face, and FIG. 3B illustrates an example of searching a contact of a subject to share the content. FIG. 3C is a diagram illustrating an example of outputting a transmission request/deny message.

Referring to FIGS. 3A to 3C, according to an example, a terminal 100 acquires images 310 and 320 including the users' faces through a camera 110 while the content is being displayed, and recognizes the faces included in the acquired images 310 and 320. According to a recognition result of the face, in the event that the face has been changed, the terminal 100 compares the new face 321 and a face image stored in storage 120, and searches contact information corresponding to the new face 321. In this example, the fact that the face has been changed indicates that the face recognized from the acquired image 310 is different from the face recognized in image 320 because an image of a different person has been captured by the camera 110. Afterwards, the terminal 100 outputs a transmission request/deny message 330, and if the user inputs a transfer command, transmits the related content to the searched contact.

Figure 4A:
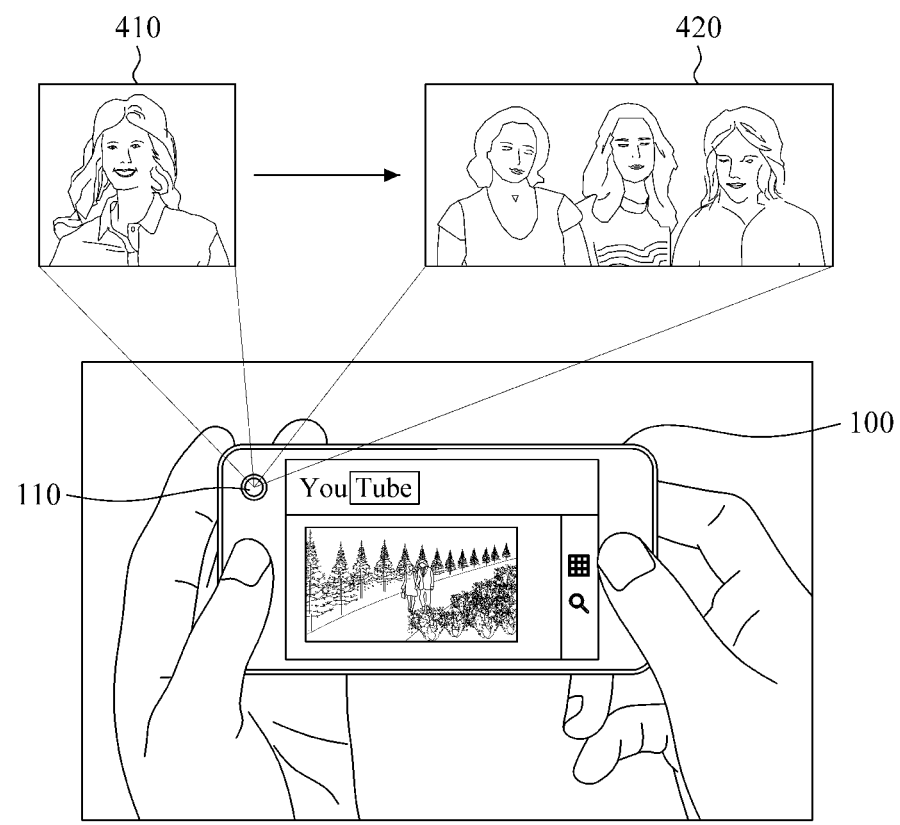
FIGS. 4A to 4D are diagrams illustrating an example of a method of using a terminal to share content by searching for various contacts.
Figure 4B:
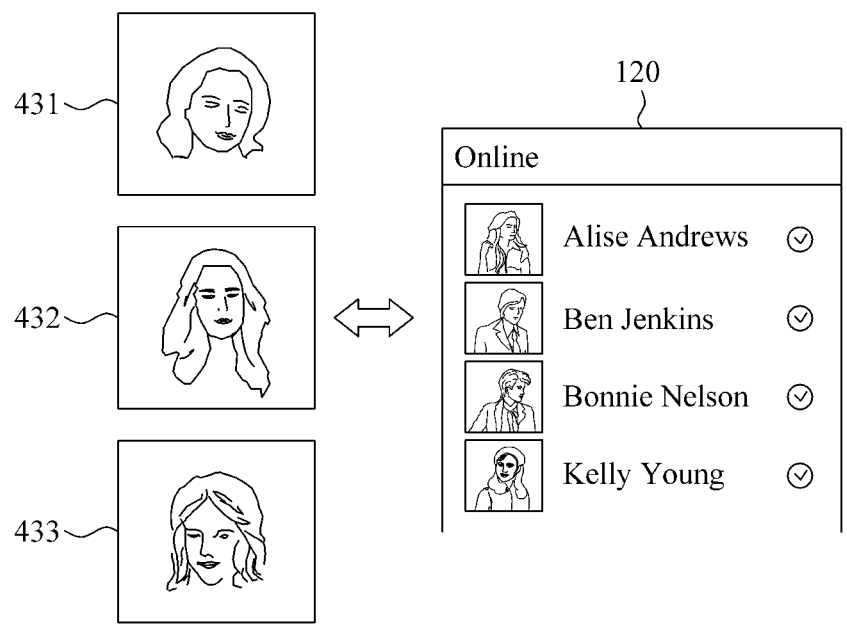
Figure 4C:
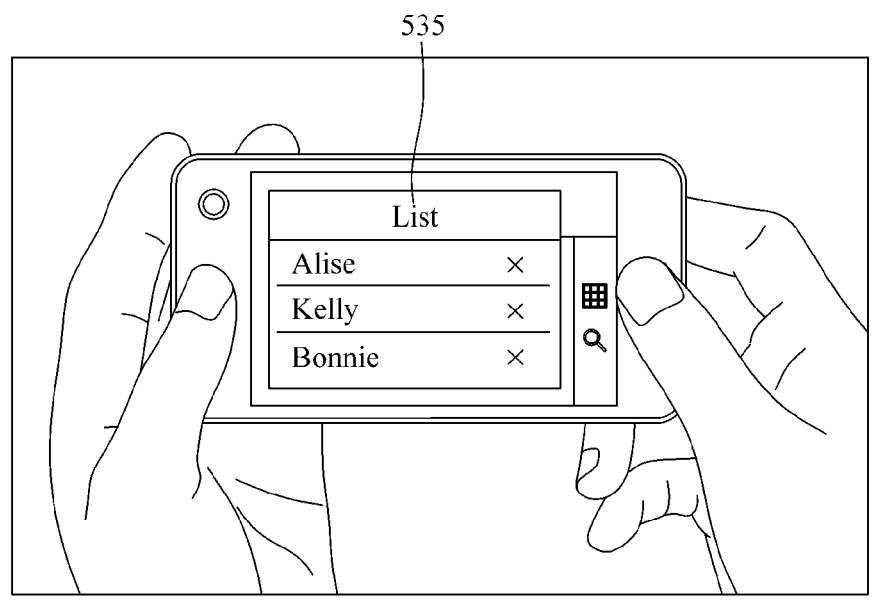
Figure 4D:
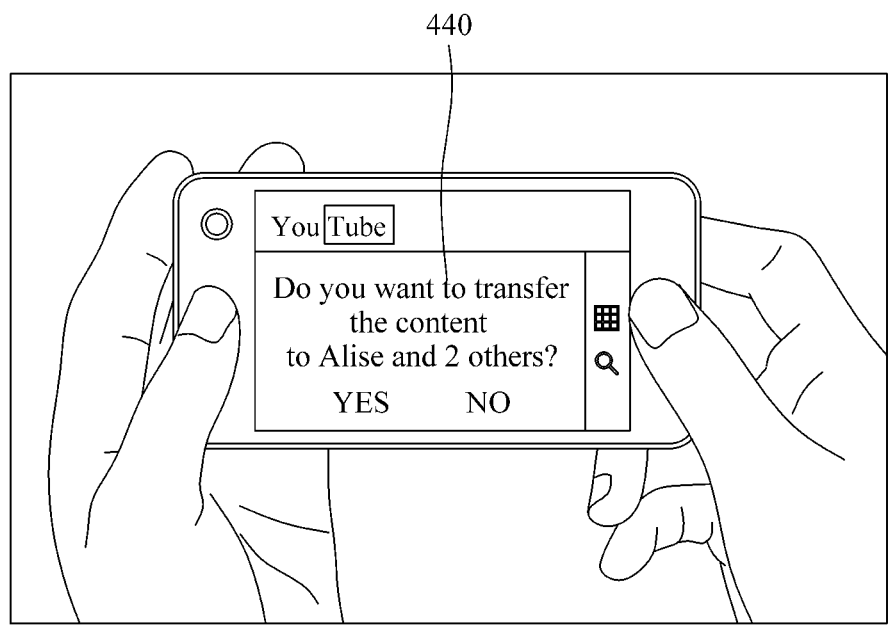

FIGS. 4A through 4D are diagrams illustrating an example of a process of a terminal sharing content after searching various contacts. For example, FIG. 4A illustrates an example of a terminal acquiring an image including a user's face. FIG. 4B illustrates an example of searching a contact of a subject to share content. FIG. 4C illustrates an example of outputting a plurality of searched contacts. FIG. 4D illustrates an example of checking a transmission request/deny message.

Referring to FIGS. 4A to 4D, in one example, a terminal 100 acquires images 410 and 420 including the user's face through a camera 110 while the content is being played, and recognizes the faces included in the acquired images 410 and 420. According to a recognition result of the face, in a case in which the face has been changed, the terminal 100 compares the three new faces 431, 432, and 433 and each face image stored in storage 120, and searches each contact corresponding to the three new faces 431, 432, and 433.

Afterwards, the terminal 100 outputs a contact list 535 including the three searched contacts. Then, if the user selects all the three contacts in the contact list 435, the terminal 100 outputs a transmission request/deny message 440, and transmits the relevant content to the selected contact according to the user's transfer command.

Figure 5:
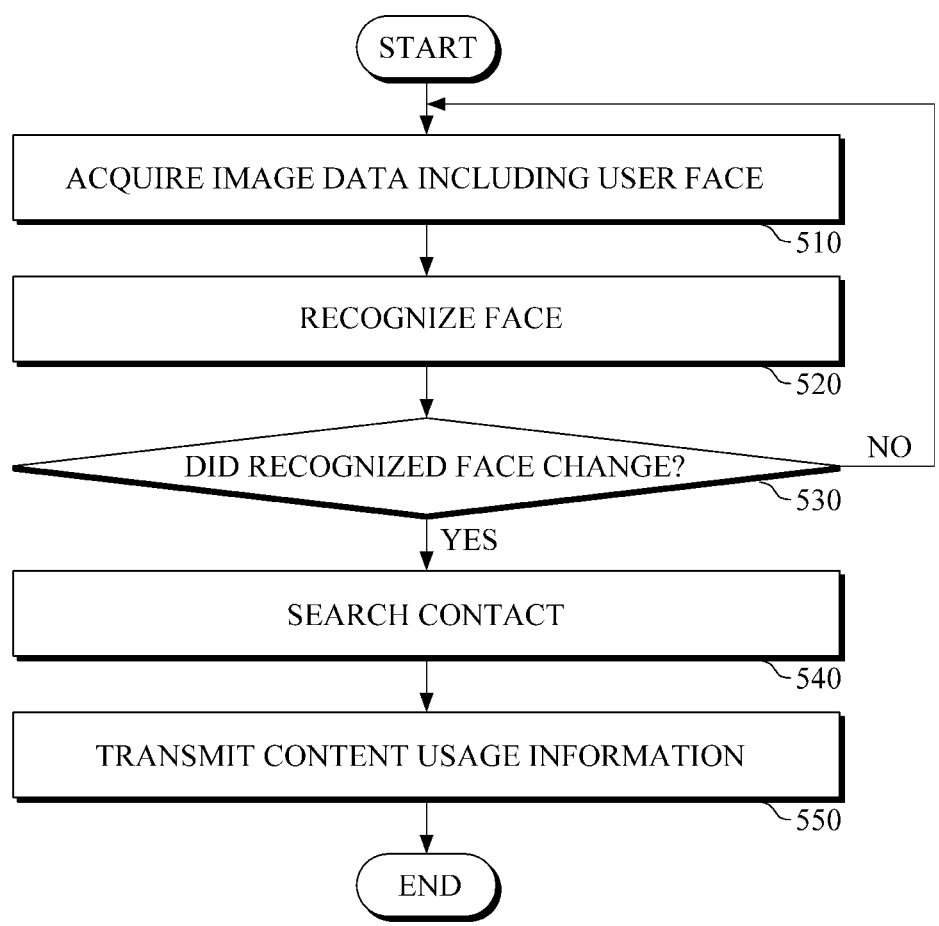
FIG. 5 is a flowchart illustrating an example of a method of sharing content with a terminal.

FIG. 5 is a flowchart illustrating a method of sharing content by using a terminal according to one embodiment.

Referring to FIG. 5, a method of sharing content by using a terminal according to one example involves acquiring image data that includes a user's face by using a camera of the terminal while the content is being displayed in 510. In this example, a camera is disposed on the same side as the display on the terminal. Accordingly, when the faces are captured by the camera, the image data includes the viewers of the content.

After the image data is acquired, the terminal recognizes the face from the acquired image data in 520. The terminal may use various face recognition algorithms.

After the face recognition, the terminal detects whether the face has been changed based on the recognition result of the face in 530. In the event that the face has been changed, the terminal searches a contact corresponding to the new face in 540. The terminal may, for example, compare the face image stored in the storage of the terminal, and the new face, and search a contact corresponding to the new face. In another example, the terminal may transmit information (e.g., face image data of the new face) on the new face to an external server, and may receive a contact corresponding to the new face from the external server.

After searching for the contact, the terminal transmits content usage information to the searched contact in 550. The content usage information may include content data, an address where the content is capable of being downloaded, and the like.

Figure 6:
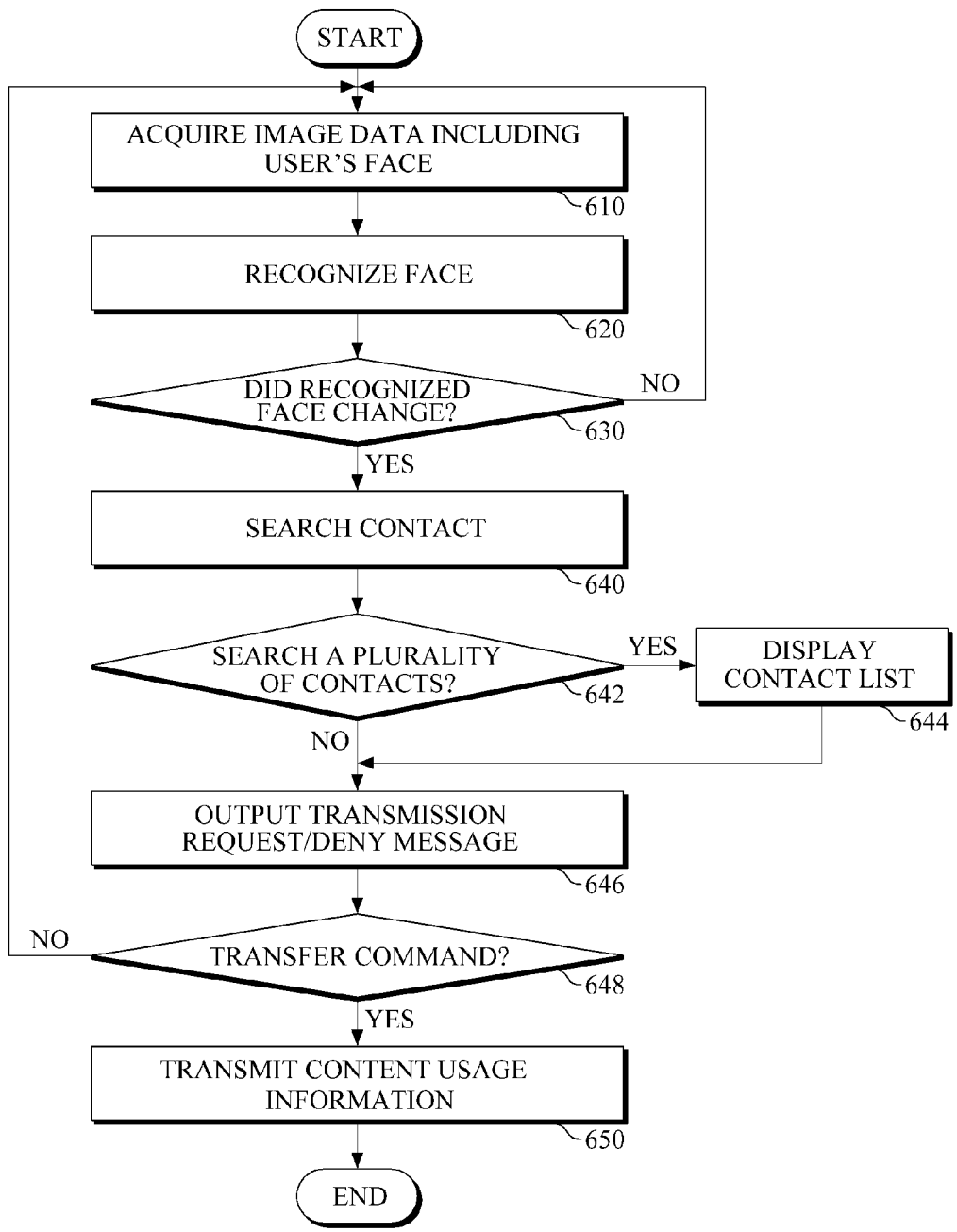
FIG. 6 is a flowchart illustrating another example of a method of sharing content with a terminal.

FIG. 6 is a flowchart illustrating a method of sharing content by using a terminal according to another embodiment.

Referring to FIG. 6, a method of sharing content of a terminal according to another example involves first acquiring image data that includes a user's face by using a camera while the content is being displayed in 610.

After acquiring the image data, the terminal recognizes the face from the acquired image data in 620. The terminal may use various face recognition algorithms to recognize the face. The face recognition may involve determining whether the face found in the acquired image data corresponds to a person or a contact.

After the face recognition, the terminal detects whether the face has been changed based on the recognition result of the face in 630. In the event that the face has been changed, the terminal searches a contact corresponding to the new face in 640.

According to the result of searching the contact in 640, if a plurality of contacts has been searched in 642, the terminal displays a contact list relevant to the plurality of the searched contacts in 644. If the terminal receives, from the user, a selection signal for the selection of at least one contact on the contact list, the terminal outputs a transmission request/deny message for the user to confirm whether or not to transmit the information that may help the use of the content to the selected contact in 646.

Otherwise, according to the result of searching for the contact in 640, if one contact has been searched in 642, the terminal outputs the transmission request/deny message to confirm whether or not to transmit the information that helps the use of the content to the selected contact in 646.

Afterwards, if an input of a transfer command is received from the user in 648, the terminal transmits the information that helps the use of the content either to the searched contact (if one contact has been searched) or to the contacts selected by the user (if a plurality of the contacts has been searched) in 650.

The methods and/or operations described above may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A terminal, which may be referred to as a computer terminal, may be an electronic or electromechanical hardware device that is used for entering data into and displaying data received from a host computer or a host computing system. A terminal described herein may refer to mobile devices such as, for example, a cellular phone, a smart phone, a wearable smart device such as a ring, a watch, a pair of glasses, a bracelet, an ankle bracket, a belt, a necklace, an earring, a headband, a helmet, a device embedded in the cloths or the like, a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blue-ray player, a setup box, or any other device capable of wireless communication or network communication consistent with that disclosed herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A terminal comprising:
    a processor comprising
        an image acquirer configured to
            acquire, from a camera, first face image data from a first image at a first time while content is being displayed, and
            acquire, from the camera, second face image data from a second image at a second time while the content is being displayed;
        a face recognizer configured to recognize a first face included in the first face image data and a second face included in the second face image data;
        a face change detector configured to detect whether the first face is different from the second face;
        a contact searcher configured to, in response to the detection that the first face is different from the second face, search a contact corresponding to the second face; and
        an information transmitter configured to transmit, to the searched contact, content usage information comprising the content or information used to acquire the content.

2. The terminal of claim 1, wherein the camera is disposed on a same side as a display of the terminal.

3. The terminal of claim 1, wherein the contact comprises at least one of an email address, a phone number, a Bluetooth® address, a mobile instant messenger address, or a social network service (SNS) address.

4. The terminal of claim 1, wherein the contact searcher is configured to search the contact corresponding to the second face in a non-transitory storage of the terminal.

5. The terminal of claim 1, wherein the contact searcher is configured to search the contact corresponding to the second face in an external server.

6. The terminal of claim 5, wherein the contact searcher is configured to transmit information on the second face to the external server, and to receive the contact corresponding to the second face from the external server.

7. The terminal of claim 1, wherein the contact searcher is configured to compare the second face to a face image stored in the terminal, and to search the contact corresponding to the second face.

8. The terminal of claim 1, wherein the content usage information comprises content data of the content or a download address of the content.

9. The terminal of claim 1, wherein, in response to a determination that a plurality of searched contacts exists, the contact searcher is configured to display the plurality of the searched contacts through a display of the terminal.

10. The terminal of claim 1, wherein the information transmitter is configured to output a message for checking whether to transmit the content usage information to the searched contact.

11. A method for sharing content of a terminal, the method comprising:
    acquiring, from a camera, first face image data from a first image at a first time while content is being displayed;
    acquiring, from the camera, second face image data from a second image at a second time while the content is being displayed;
    recognizing a first face included in the first face image data and a second face included in the second face image data;

detecting whether the first face is different from the second face;

in response to the detection that the first face is different from the second face, searching a contact corresponding to the second face; and transmitting, to the searched contact, content usage information comprising the content or information used to acquire the content.

12. The method of claim 11, wherein the camera is disposed on a same side of the terminal as a display of the terminal.

13. The method of claim 11, wherein the contact comprises at least one of an email address, a phone number, a Bluetooth® address, a mobile instant messenger address, or a social network service (SNS) address.

14. The method of claim 11, wherein the searching of the contact comprises searching the contact corresponding to the second face in a non-transitory storage of the terminal.

15. The method of claim 11, wherein the searching of the contact comprises searching the contact corresponding to the second face in an external server.

16. The method of claim 15, wherein the searching of the contact comprises:

transmitting information on the second face to the external server; and receiving the contact corresponding to the second face from the external server.

17. The method of claim 11, wherein the searching of the contact comprises comparing the second face to a face image stored in the terminal, and searching the contact corresponding to the second face.

18. The method of claim 11, wherein the content usage information comprises content data of the content or a download address of the content.

19. The method of claim 11, wherein, in response to a determination that a plurality of searched contacts exists, the method further comprises displaying the plurality of the searched contacts through a display of the terminal.

20. The method of claim 11, the method further comprising:

outputting a message for checking whether to transmit the content usage information to the searched contact.

21. A terminal comprising:

a processor comprising
an image acquirer configured to
acquire, from a camera, a first image at a first time while content is being displayed, and
acquire, from the camera, a second image at a second time while the content is being displayed;
a face recognizer configured to
recognize a first face in the first image, and
recognize a second face in the second image;
a face change detector configured to detect whether the first face is different from the second face;
a contact searcher configured to, in response to the detection that the first face is different from the second face, search a contact corresponding to the second face; and
an information transmitter configured to transmit, to the searched contact, content usage information comprising the content or information used to acquire the content.

* * * * *